United States Patent [19]
Suzuki et al.

[11] Patent Number: 6,081,058
[45] Date of Patent: *Jun. 27, 2000

[54] MOTOR STRUCTURE HAVING A PERMANENT MAGNET MOTOR WITH GROOVES TO REDUCE TORQUE RIPPLES

[75] Inventors: Yuzuru Suzuki, Hamana-gun; Sakae Fujitani, Hamakita, both of Japan

[73] Assignee: Minebea Co., Ltd., Nagano, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/655,090

[22] Filed: Jun. 4, 1996

[30] Foreign Application Priority Data

Jun. 7, 1995 [JP] Japan .................................. 7-140221

[51] Int. Cl.⁷ .......................... H02K 21/12; H02K 11/00
[52] U.S. Cl. .......................... 310/156; 310/68 B; 310/261
[58] Field of Search ................................. 310/261, 156, 310/192, 254, 67 R, 179, 51, 187; 360/98.07, 99.04, 99.08

[56] References Cited

U.S. PATENT DOCUMENTS

| | | | |
|---|---|---|---|
| 3,860,843 | 1/1975 | Kawasaki et al. | 310/67 |
| 4,424,463 | 1/1984 | Musil | 310/49 R |
| 4,626,727 | 12/1986 | Janson | 310/156 |
| 4,752,707 | 6/1988 | Morrill | 310/185 |
| 5,004,965 | 4/1991 | Otokawa et al. | 318/254 |
| 5,030,864 | 7/1991 | Van Hout et al. | 310/67 R |
| 5,250,867 | 10/1993 | Gizaw | 310/179 |
| 5,252,876 | 10/1993 | Kawai et al. | 310/184 |
| 5,289,066 | 2/1994 | Clark | 310/67 R |
| 5,383,265 | 1/1995 | Nishizawa | 29/596 |
| 5,410,201 | 4/1995 | Tanaka et al. | 310/68 B |
| 5,422,569 | 6/1995 | Nakahara et al. | 324/174 |
| 5,610,464 | 3/1997 | Asano et al. | 310/156 |
| 5,623,382 | 4/1997 | Moritan et al. | 360/99.08 |
| 5,821,654 | 10/1998 | Woo | 310/90 |

FOREIGN PATENT DOCUMENTS

| | | |
|---|---|---|
| 0 433 479 | 6/1991 | European Pat. Off. . |
| 2 386 928 | 3/1978 | France . |
| 61-58456 | 3/1986 | Japan . |

*Primary Examiner*—Nicholas Ponomarenko
*Assistant Examiner*—Tran N Nguyen
*Attorney, Agent, or Firm*—Staas & Halsey LLP

[57] ABSTRACT

A motor structure in a salient pole type DC motor in which torque ripple and cogging torque are reduced, without deceasing motor efficiency, and the torque constant and irregularity of the rotation are reduced. The magnetic flux density distribution of an air gap approaches a sine wave shape by forming a groove in the vicinity of the neutral part (a boundary of an N-pole and an S-pole) of a rotor magnet.

4 Claims, 7 Drawing Sheets

MOTOR STRUCTURE HAVING A PERMANENT MAGNET MOTOR WITH GROOVES TO REDUCE TORQUE RIPPLES

BACKGROUND OF THE INVENTION

1. Field of the Invention

This invention relates to a motor structure in a salient pole type DC motor in which a cogging torque and a torque ripple are reduced without decreasing an efficiency, a torque constant and hence the irregularity of rotation is reduced.

2. Description of the Prior Art

Heretofore, as a method for reducing the irregularity of a torque or rotation, there has been a type of motor in which switching is conducted in a (2n+1) phase, the ratio of the number of the poles of a rotor magnet to the number of salient poles wound with the winding of a stator core is (2n+2):(2n+1), and the phase currents of the stator windings are sequentially switched in response to the rotating position, as for example, disclosed in Japanese Patent Publication laid-open No. 49-8568. In this type, the number of cogging torque becomes the least common multiple of the number of the stator windings and the number of the poles of the rotor magnet, the number of the cogging torque per one revolution is increased, the apparent value is felt to be small, but does not become "0". Accordingly, in the case of a motor which is used at a low speed so that the irregularity of its rotation becomes a problem like, for example, a record player turntable drive motor or a floppy disk spindle motor, a method of providing an interpole at the stator, a slot pitch is formed to be not uniform but irregular or the shape of a salient pole piece is altered are used together.

However, although these methods can reduce the irregularity of the torque but, have disadvantages that the motor efficiency and the torque constant are also decreased.

On the other hand, as to the method of forming grooves or slits on a rotor magnet, there is a method described in "Brushless DC motor and rotor magnet thereof" of Japanese Patent Application laid-open No. 1-318536 filed by the same inventors as this application. This prior invention is a motor comprising:

1) a stator having salient poles wound with windings and interpoles wound without windings,
2) the number of rotor pole detecting means applied to a brushless DC motor being one, and
3) the number of grooves or slits being half the number of the poles.

This prior invention has features that
1) the starting torque is stabilized, and
2) the motor efficiency is improved.

The prior invention is fundamentally different from the present invention.

SUMMARY OF THE INVENTION

In order to achieve the above-described object of this invention, there is provided according to the invention a motor structure in a motor comprising an air gap formed of a rotor magnet and a stator core in a radial direction in such a manner that said stator structure is a salient pole type characterized in that a magnetic groove or a slit is formed in the vicinity of a neutral part (a boundary between an N pole and an S pole) of said rotor magnet side so that the magnetic flux density change of said air gap approaches a sine wave state as compared with that of said air gap of a constant length.

According to this invention, the groove or the slit to generate the magnetic change is formed in the rotor magnet, and the magnetic flux density distribution in the air gap is more approaches to the sine wave shape. Accordingly, the torque ripple is reduced without decreasing the motor efficiency and the torque constant. As a result, the irregularity of the rotation can be suppressed to a small value.

DESCRIPTION OF THE PREFERRED EMBODIMENTS

Figure 1:
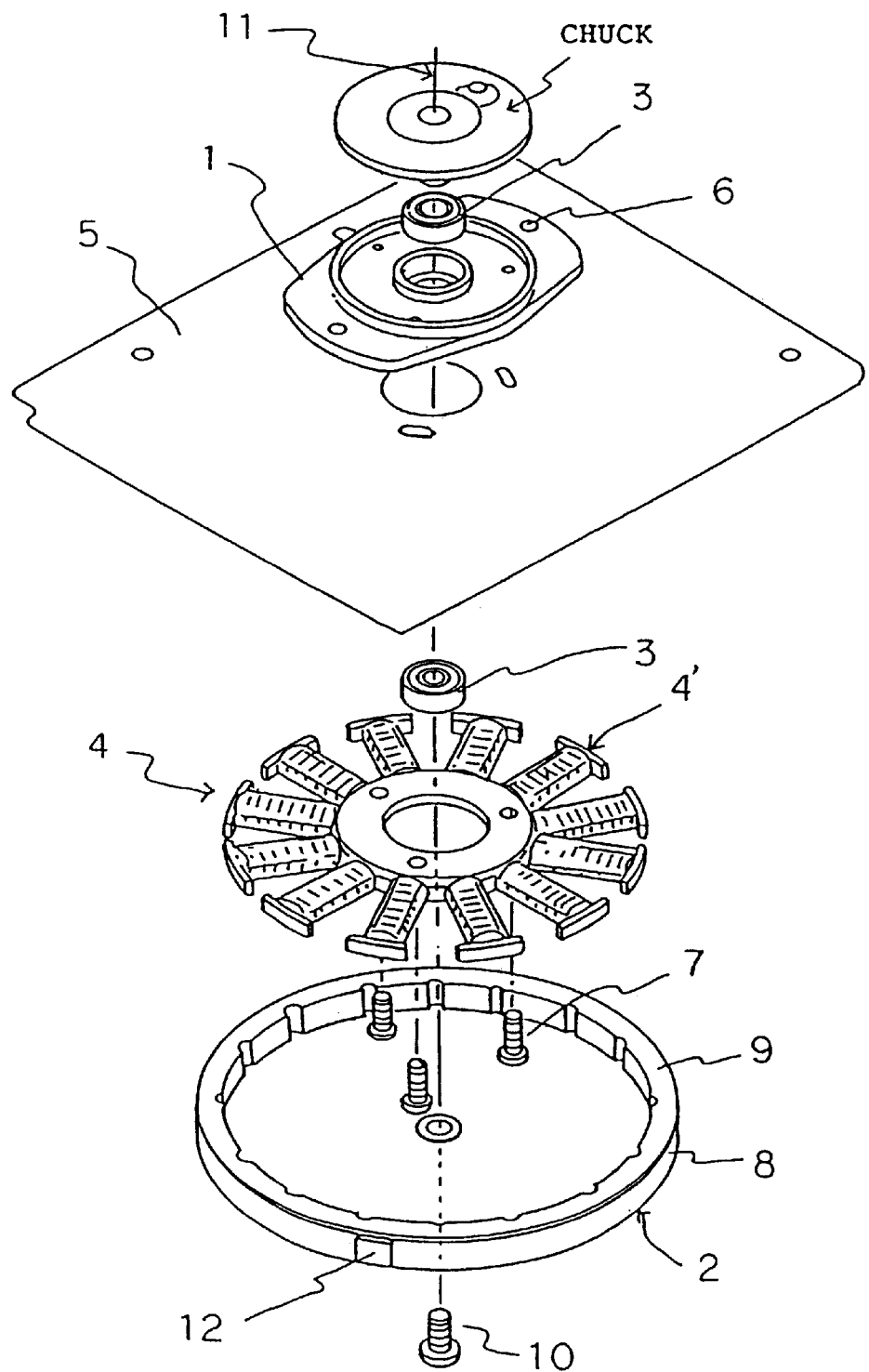
FIG. 1 is an exploded perspective view showing the essential portion of a motor applied to a three-phase brushless DC spindle motor of a flat radial air gap type.

An embodiment of this invention will be described in detail with reference to the accompanying drawings. FIG. 1 is an exploded perspective view showing the essential portion of the motor in which this invention is applied to a three-phase brushless DC spindle motor of a flat radial air gap type. In FIG. 1, numeral 1 denotes a housing made from aluminum. Bearings 3 (two pieces) for rotatably supporting a rotor assembly 2 are contained in the housing 1. A stator assembly 4 (described later) and a driving circuit plate 5 (described later) are fixed to the housing 1. Mounting holes 6 are to fix a motor completed unit to a frame such as FDD (abbreviation for "floppy disc drive") also prepared in the housing 1.

The driving circuit plate 5 is formed of a soft iron plate. An insulating film is provided on the surface of the driving circuit plate 5. A printed circuit is provided on the surface of the insulating film. Electronic components such as an integrated circuit necessary to drive the three-phase brushless DC motor, three rotor position detectors, resistors, capacitors, etc., are mounted thereon. An electric circuit necessary to drive the motor is also included. An FG (abbreviation for "frequency generator") pattern coil for sensing the rotating speed of the rotor is also printed on the plate 5. Twelve radial stator salient poles 4' are formed in the stator assembly 4. A plurality of magnetic steel sheets punched by a press is laminated and stacked in a rotational shaft direction, the stator assembly 4 is comprised as to be insulated at necessary positions and wound.

Stator yoke set screws 7 (three pieces) are used to clamp the driving circuit plate 5 and the stator assembly 4. The rotor assembly 2 is formed by adhering a rotor magnet 9 to the inner periphery of a rotor yoke 8 made of a ferromagnetic material, and clamped at a shaft 11 by using a rotor set screw 10. Thus, the rotor assembly 2 is integrated with the shaft 11, and rotatably supported by two ball bearings 3 inserted in grooves of the housing 1. The operation of the motor is the same as a general three-phase bipolar driving system using three rotor pole detectors, and hence the description thereof will be omitted.

Figure 2:
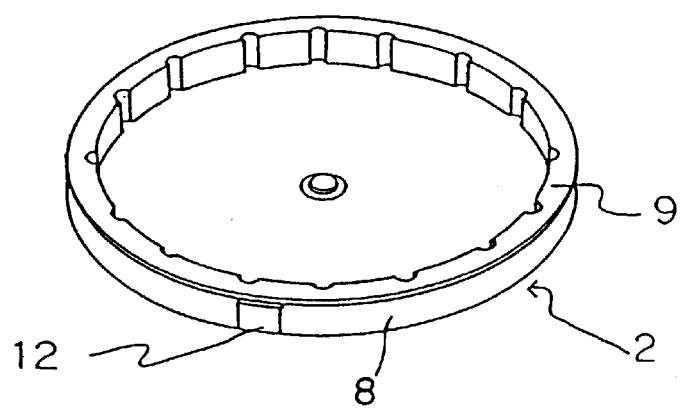
FIG. 2 is a perspective view showing a rotor assembly 2.
Figure 3:
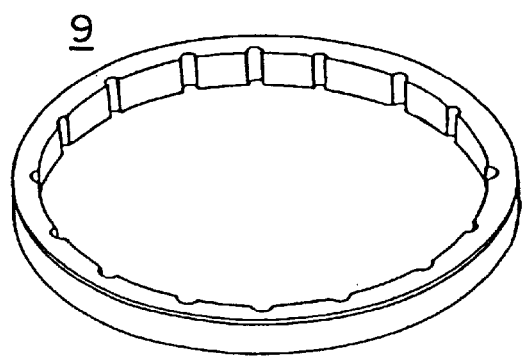
FIG. 3 is a perspective view showing a rotor magnet 9.
Figure 4:
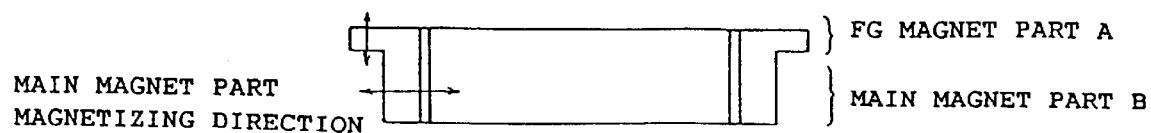
FIG. 4 is a sectional view showing the rotor magnet 9.

The shape of the rotor magnet 9 according to this invention will be described in detail by referring to FIGS. 2, 3 and 4. FIG. 2 is a perspective view showing the rotor assembly 2. As described above, the rotor assembly 2 has the rotor yoke 8 made of a ferromagnetic material and the rotor magnet 9 adhered to the inner periphery of the rotor yoke 8, and also has an index magnet 12 mounted at an arbitrary position of the outer periphery of the rotor yoke 8. FIG. 3 is a perspective view showing the rotor magnet 9. The rotor magnet 9 has two parts: an FG magnet part A to be operated with the FG pattern coil (not shown in FIG. 1) printed on the driving circuit plate 5; and a main magnet part B for generating a torque as a motor. FIG. 4 is a sectional view showing the magnetizing directions of the FG magnet part A and the main magnet parts B of the rotor magnet 9. The magnetizing direction of the FG magnet part A is an axial direction (a direction perpendicularly crossing the FG pattern coil), and the magnetizing direction of the main magnet part B is a radial direction (a direction perpendicularly crossing the stator coil).

The motor according to this invention is a salient pole type motor having an air gap in a radial direction and a laminated stator core structure in such a manner that the length of an air gap formed of the rotor magnet and the stator core is varied in the vicinity of the neutral part (a boundary of an N-pole and an S-pole) of the rotor magnet. As its technical means, a groove or a slit is formed at the neutral part of the rotor magnet to approach the magnetic flux density distribution in the air gap to a sine wave shape. As a result, the cogging torque and the torque ripple are reduced without decreasing the motor efficiency and the torque constant, and the motor having a small irregularity of rotation can be provided.

Figure 5:
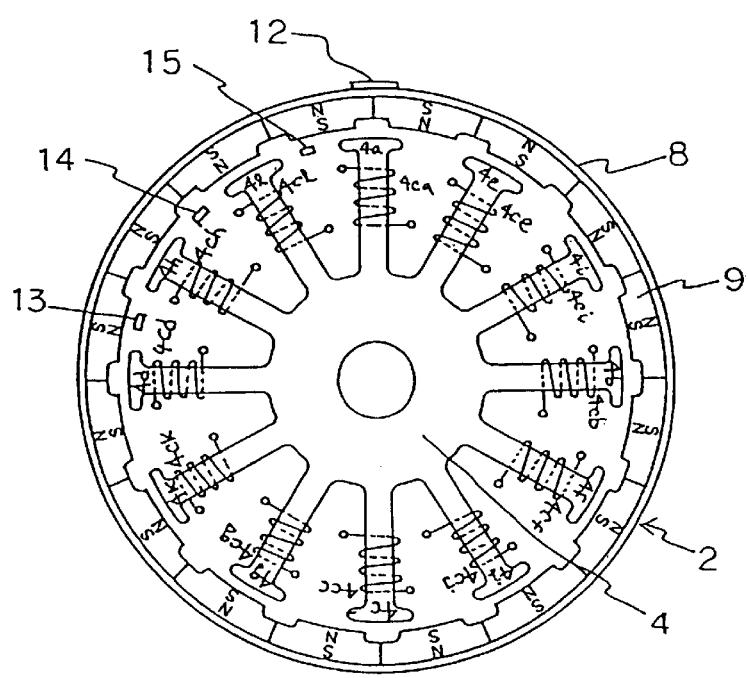
FIG. 5 is a view of the principle of a 3-phase brushless DC motor according to this invention.

FIG. 5 is a principle view of a three phase brushless DC motor according to this invention, illustrating an example of an outer rotor type having sixteen rotor magnet poles and twelve salient poles wound with the windings of the stator core. In FIG. 5, symbols 4a to 4l denote stator poles; 4ca to 4cl, stator coils; and 13, 14, 15, rotor pole detectors.

The stator assembly 4 has twelve stator poles 4a to 4l uniformly distributed at a central angle of 30° and twelve stator coils 4ca to 4cl are respectively wound on the stator poles. The three rotor pole detectors 13, 14, and 15 are magnetoelectric transducers, such as, for example, Hall elements, etc. The positions of the rotor pole detectors 13, 14, 15 are provided at substantially intermediate positions between the stator poles 4d and 4h, between the stator poles 4h and 4l, and between the stator poles 4l and 4a, and hence the positions which can firmly detect the poles of the rotor magnet 9 via the air gap.

Figure 6:
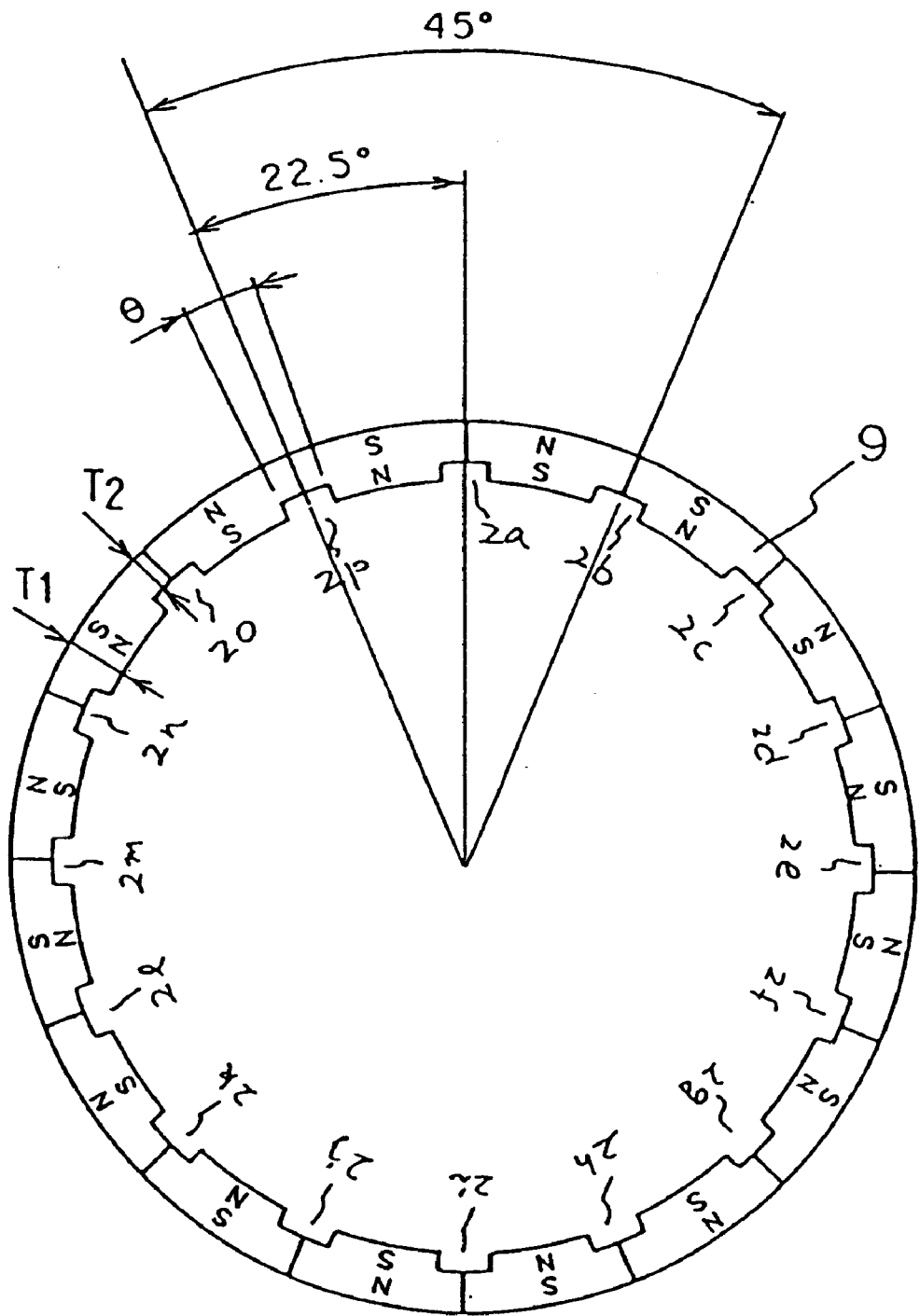
FIG. 6 is a plane view showing the detail of the rotor magnet.
Figure 7:
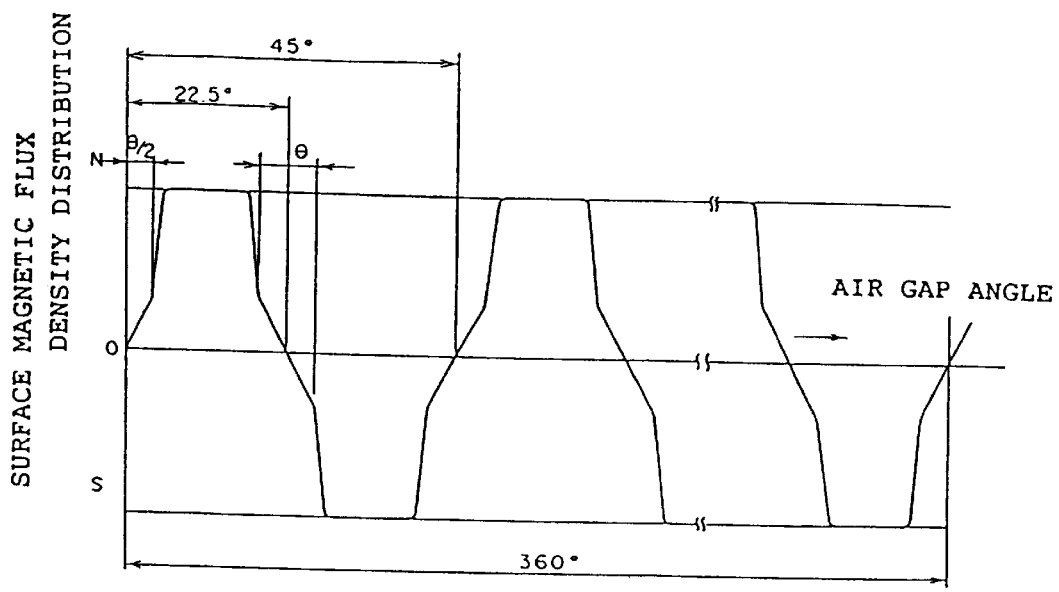
FIG. 7 is a plane view showing the surface magnetic flux density distribution of the rotor magnet.

The detail of the rotor magnet 9 is shown in FIG. 6, and the surface magnetic flux density distribution of the rotor magnet 9 is shown in FIG. 7.

Incidentally, the FG magnetized part (the part A of FIGS. 3 and 4) magnetized at a low level integrally with the rotor magnet end face (corresponding to the lower surface in FIGS. 5 and 6) in FIGS. 5 and 6 is not related to the description of the principle of this invention, and hence the description will be omitted.

In FIG. 6, the rotor magnet 9 has sixteen magnetized poles, and has the same magnetic grooves as the sixteen poles 2a to 2p. All the positions of the grooves of this embodiment are located at the pole switching points (neutral points). The width between the pole switching points is totally θ of the pole switching points to the N-pole and the S-pole of θ/2 of the central angle. The surface magnetic flux density of the rotor magnet 9 becomes as shown in FIG. 7 due to the presence of such magnetic grooves 2a to 2p. That is, the surface magnetic flux density of the other parts, and more approaches to the distribution of the sine wave shape as compared with the case having no grooves.

The feature of this invention is that the grooves or the slits to generate a magnetic change are formed in the rotor magnet and hence the magnetic flux density distribution in the air gap more approaches to the sine wave shape. From this feature, the torque ripple is reduced without decreasing the motor efficiency and the torque constant. As a result, the irregularity of the rotation can be suppressed to the small value.

Experiments here conducted regarding the influences of the angle or width and the depth of the groove of the rotor magnet to the motor characteristics of this invention. In the experiments, the structure of the stator is made constant. The results for the motor voltage, the load torque, the motor current, the motor efficiency, the torque constant and the irregularity of the rotation in the cases of three types of angles θ of the grooves 2a to 2p of the rotor magnet 9 shown in FIG. 6 being 0°, 7.5° and 11.25° are all shown in Table 1. However, all the depth of the groove (T1 to T2 of FIG. 6) is 0.25 mm, which is the same value as the length of the air gap.

TABLE 1

| | Depth of groove of 0.25 mm | | |
|---|---|---|---|
| | Prior art | This invention | |
| Characteristics | θ = 0 | θ = 360/N = 7.5 | θ = 360/2P = 11.25 |
| Motor voltage (V) | 5 | 5 | 5 |
| Motor load torque (g-cm) | 40 | 40 | 40 |
| Motor current (A) | 0.152 | 0.150 | 0.158 |
| Motor efficiency (%) | 16.2 | 16.4 | 15.6 |
| Torque constant (gcm/A) | 401 | 401 | 378 |
| Irregular rotation (%) | 0.193 | 0.150 | 0.190 |

N = least common multiple of number of rotor poles and number of salient poles wound with windings of stator core (N = 48 in the example of FIG. 5)
P = number of rotor poles The result of the similar experiments conducted by setting the depth of the groove to 0.5 mm (double the length of the air gap) is shown in Table 2.

TABLE 2

| | Depth of groove of 0.50 mm | | |
|---|---|---|---|
| | Prior art | This invention | |
| Characteristics | θ = 0 | θ = 360/N = 7.5 | θ = 360/2P = 11.25 |
| Motor voltage (V) | 5 | 5 | 5 |
| Motor load torque (g-cm) | 40 | 40 | 40 |
| Motor current (A) | 0.152 | 0.153 | 0.159 |
| Motor efficiency (%) | 16.2 | 16.1 | 15.5 |
| Torque constant (gcm/A) | 402 | 398 | 379 |

TABLE 2-continued

| | Depth of groove of 0.50 mm | | |
|---|---|---|---|
| | Prior art | This invention | |
| Characteristics | θ = 0 | θ = 360/N = 7.5 | θ = 360/2P = 11.25 |
| Irregular rotation (%) | 0.193 | 0.180 | 0.192 |

As understood from the Tables 1 and 2, according to this invention, the irregularity of the rotation can be reduced without decreasing the motor efficiency and the torque constant by suitably selecting the width of the groove of the rotor magnet and the depth of the groove.

It is also understood in this embodiment, to be effective, the groove width is set as θ=360/N=7.5° (⅓ of the pole) and the depth of the groove is set at (T1−T2=0.25 mm (the same value as the air gap).

Figure 8:
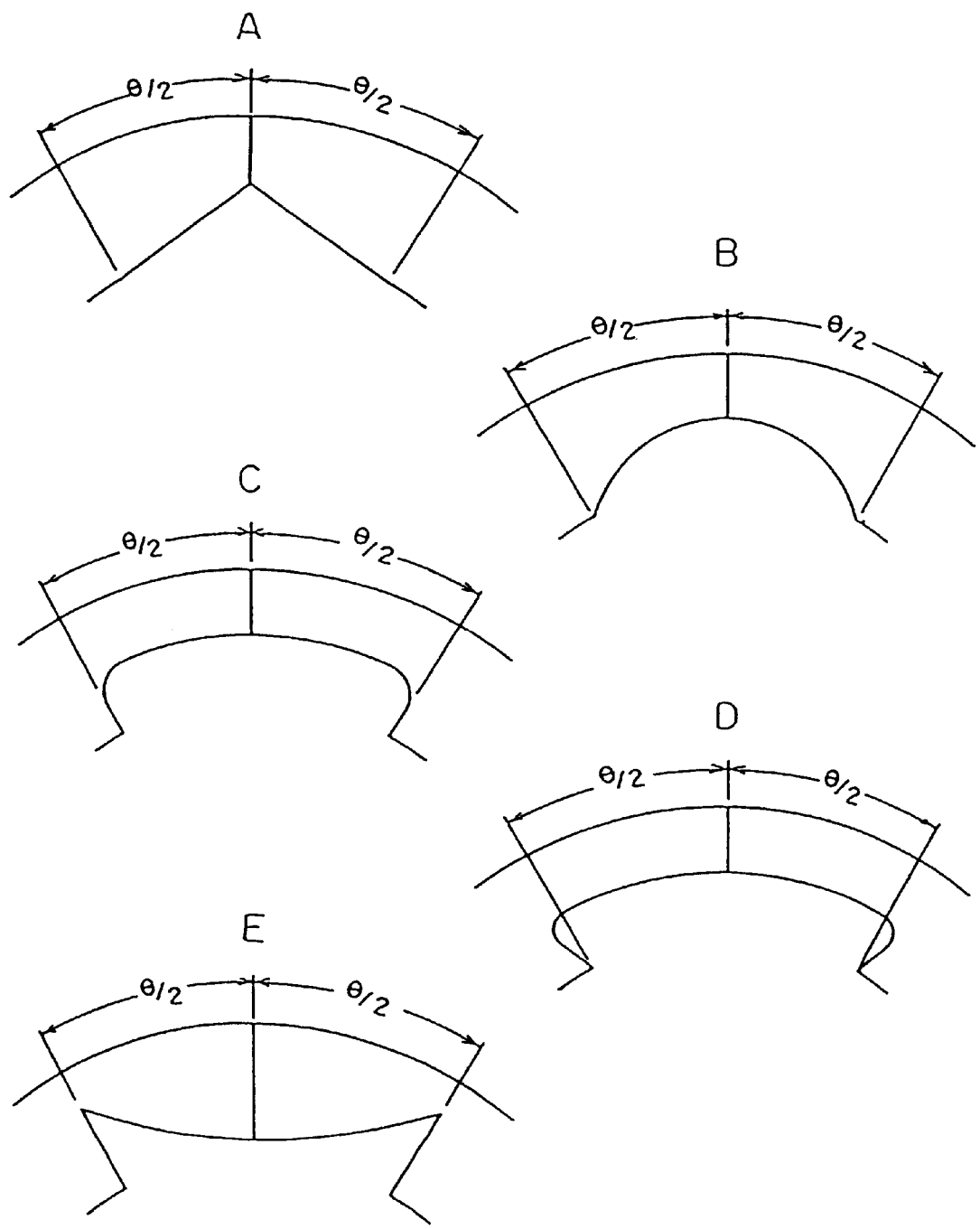
FIG. 8 is a partial flat view showing another embodiment of the rotor magnet.

The sectional shape of the groove formed on the rotor magnet is not limited only to the rectangular shape, but may be as shown by A to E in FIG. 8. For example, the A of FIG. 8 is a V-groove structure, and the B is a semicircular shape.

As shown by the C in FIG. 8, both the sides of the bottom of the groove may be rounded, or by the D, both the sides of the bottom of the groove may be bitten from a central angle θ.

Further, as shown by E in FIG. 8, the center of the groove may be extended toward the opposed surface of the stator. The sectional shape of the groove may be suitably modified within the scope of this invention.

Figure 9:
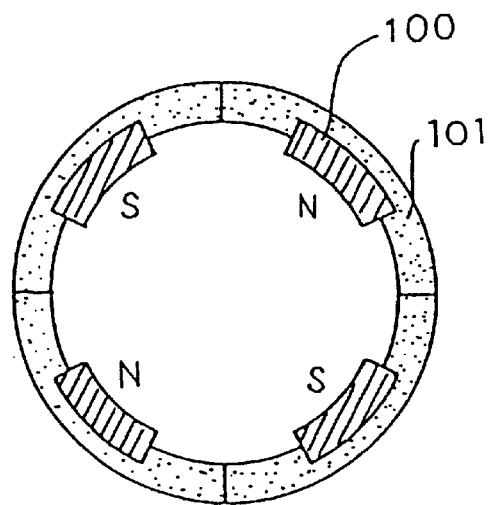
FIG. 9 is a plane view showing still another embodiment of the rotor magnet.
Figure 10:
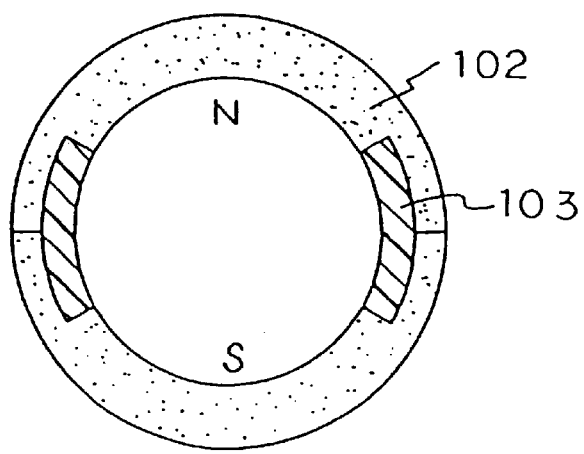
FIG. 10 is a flat view showing the still another embodiment of the rotor magnet.

The structure of the rotor magnet may be also deformed. FIGS. 9 and 10 show the examples of the deformed rotor magnet. To improve the characteristics, the rotor magnet may be formed of a high performance magnet such as a sintered magnet or a rare earth element magnet. However, when the entire rotor magnet is manufactured by the sintered magnet or the rare earth element magnet, it becomes expensive.

Accordingly, in the embodiment shown in FIG. 9, only necessary portions are formed as high performance magnets 100 like the sintered magnets or the rare earth element magnets, and the other parts are formed of a low cost plastic magnet 101 which can be easily molded in a desired shape. Thus, equivalent magnetic groove is formed, and a rotor magnet having high cost performance is obtained.

Since the groove of the rotor magnet becomes thin, it is weak in strength, feasibly deformed, and necessary to be sufficiently carefully handled. The example shown in FIG. 10 is strengthened by filling a suitable reinforcing material 103 in the groove of a rotor magnet 102.

As the reinforcing material 103, for example, a nonmagnetic plastic material is employed. When the rotor magnet 102 is formed of the high performance magnet such as the sintered magnet or the rare earth element magnet, as the reinforcing material 103, a plastic magnet having low performance may be employed.

The groove or the slit of the rotor magnet in which the FG magnet part A and the main magnet part B shown in FIG. 4 are integrally formed may only be part of the main magnet part B, or may be passed to the FG magnet part A. The reason is a sufficient effect can be obtained by the degree that the depth of the groove is the length of the air gap (normally about 0.2 to 0.4 mm), sufficiently smaller than the width of the magnetized surface of the FG magnet, and hence the influence of the FG magnet is so small as to be ignored.

The embodiments of this invention have been described in detail. However, this invention is not limited only to the structures of the embodiments. The embodiment is of the outer rotor type motor. However, this invention may also be applied to an inner rotor type. Further, the motor having small irregularity of the rotation is also obtained by the similar reason without depending upon the driving type or the number of the poles of the magnet. Various modifications may also be provided in the components formed of the materials of the magnet and the reinforcing material.

Further, in addition to the type of detecting the rotor position by the magnetoelectric transducer, this invention may also be applied to the type of detecting the rotor position by an optical type.

According to this invention, there is provided the motor structure in the motor comprising the air gap formed of the rotor magnet and the stator core in a radial direction in such a manner that the stator structure is the salient pole type characterized in that the magnetic groove or the slit is formed in the vicinity of the neutral part (a boundary between an N pole and an S pole) of said rotor magnet side so that the magnetic flux density change of said air gap approaches the sine wave state as compared with that of said air gap of the constant length. Therefore, the motor torque ripple and the cogging torque is reduced without decreasing the motor efficiency and the torque constant, and even at the time of low rotation, the motor having small irregularity of the rotation can be provided.

Particularly recently, a linear drive type using the output waveform of a rotor position detector is employed as a drive system for suppressing the generation of a switching noise at the time of commutating, and hence this type of invention for obtaining the sine wave is effective therefore.

What is claimed is:

1. A motor structure, comprising:
    a stator core including a number M salient poles, a rotor including a rotor magnet having a permanent magnet with a number P of poles of said rotor magnet, an air gap between each salient pole and the rotor magnet, whereby P and M are integers, and P is larger than M,
    said rotor magnet having a main magnet part including N poles and S poles, a frequency generator magnet part positioned at an outer periphery of the rotor magnet, and said rotor magnet having a substantially circular cylindrical surface facing a side of said stator core;
    a plurality of grooves, each formed in the vicinity of a magnetically neutral part between each and every said N pole and said S pole pair, all around said rotor magnet;
    wherein a width of the grooves, as observed from a center of the rotor, has a value approximately equal to 360°/X, where X is the least common multiple of P and M, which width of the grooves is ⅓ of the width of the magnetizing pole of said permanent magnet, and
    wherein a deepest depth of said grooves is substantially equal to the length of the air gap.

2. A motor structure according to claim 1, wherein said stator core has no interpole and a pitch of salient poles divided in a circumferential direction is uniform.

3. A motor structure according to claim 1, wherein the number of said plurality of grooves is equal to the salient poles of said rotor magnet.

4. A motor structure according to claim 1, wherein said plurality of grooves is formed in the surface of said rotor magnet facing said stator core.

* * * * *